US009910188B2

(12) United States Patent
Valero et al.

(10) Patent No.: US 9,910,188 B2
(45) Date of Patent: Mar. 6, 2018

(54) SUBTERRANEAN IMAGER TOOL SYSTEM AND METHODOLOGY

(71) Applicant: Schlumberger Technology Corporation, Sugar Land, TX (US)

(72) Inventors: Henri-Pierre Valero, Sagamihara (JP); Emmanuel Legendre, Clamart (FR); Takeo Fujihara, Machida (JP)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 14/914,636

(22) PCT Filed: Sep. 9, 2014

(86) PCT No.: PCT/US2014/054683
§ 371 (c)(1),
(2) Date: Feb. 25, 2016

(87) PCT Pub. No.: WO2015/038507
PCT Pub. Date: Mar. 19, 2015

(65) Prior Publication Data
US 2016/0209543 A1    Jul. 21, 2016

Related U.S. Application Data

(60) Provisional application No. 61/876,768, filed on Sep. 12, 2013.

(51) Int. Cl.
*G01V 1/40* (2006.01)
*G01V 3/18* (2006.01)
(Continued)

(52) U.S. Cl.
CPC ........ *G01V 11/002* (2013.01); *E21B 17/1078* (2013.01); *E21B 47/01* (2013.01);
(Continued)

(58) Field of Classification Search
CPC .......... G01V 1/40; G01V 3/18; G01V 11/005; G01V 11/002; E21B 47/082; E21B 17/1078; E21B 47/01; E21B 47/02
(Continued)

(56) References Cited

U.S. PATENT DOCUMENTS 4,899,112 A    2/1990  Clark et al.
5,899,958 A    5/1999  Dowell et al.
(Continued)

OTHER PUBLICATIONS

Search Report issued in related European application EP14844376 dated Apr. 11, 2017. 3 pages.
(Continued)

*Primary Examiner* — Daniel L Murphy

(57) ABSTRACT

A technique facilitates the accumulation and analysis of data related to a subterranean formation. An arrangement of different types of sensors is mounted on a collar utilized in accumulating data on the subterranean formation. The sensors are operable in combination to improve the image quality of data obtained with respect to the subterranean formation. Certain applications utilize an arrangement of sensors comprising at least one of each of an electromagnetic sensor and an ultrasonic pulse-echo transducer. A stabilizer or stabilizers may be used to precisely orient and position the sensors within a wellbore.

19 Claims, 3 Drawing Sheets

(51) Int. Cl.
*G01V 11/00* (2006.01)
*E21B 47/01* (2012.01)
*E21B 47/08* (2012.01)
*E21B 17/10* (2006.01)
*E21B 47/02* (2006.01)

(52) U.S. Cl.
CPC ............ *E21B 47/02* (2013.01); *E21B 47/082* (2013.01); *G01V 1/40* (2013.01); *G01V 3/18* (2013.01); *G01V 11/005* (2013.01)

(58) Field of Classification Search
USPC .......................................................... 367/25
See application file for complete search history.

(56) References Cited

U.S. PATENT DOCUMENTS

| | | | |
|---|---|---|---|
| 6,173,793 | B1 | 1/2001 | Thompson et al. |
| 6,585,044 | B2* | 7/2003 | Rester ................... E21B 47/10 |
| | | | 166/187 |
| 2002/0062992 | A1 | 5/2002 | Fredericks et al. |
| 2003/0137430 | A1 | 7/2003 | Chalitsios et al. |
| 2005/0132794 | A1* | 6/2005 | Spross ................... E21B 7/067 |
| | | | 73/152.03 |
| 2006/0220649 | A1 | 10/2006 | Martinez et al. |
| 2007/0186639 | A1 | 8/2007 | Spross et al. |
| 2009/0222209 | A1 | 9/2009 | Morys |
| 2012/0192640 | A1 | 8/2012 | Minh et al. |

OTHER PUBLICATIONS

Examination Report issued in related European application EP14844376 dated May 2, 2017. 7 pages.

* cited by examiner

SUBTERRANEAN IMAGER TOOL SYSTEM AND METHODOLOGY

CROSS-REFERENCE TO RELATED APPLICATION

The present document is based on and claims priority to U.S. Provisional Application Ser. No. 61/876,768, filed Sep. 12, 2013, incorporated herein by reference.

BACKGROUND

Hydrocarbon fluids such as oil and natural gas are obtained from a subterranean geologic formation by drilling a well that penetrates the hydrocarbon-bearing formation. In a variety of applications, sensors are used to acquire data on the subterranean formation during the drilling process and/or during other phases of well preparation and production. In some applications, tools such as measurement-while-drilling tools and logging-while-drilling tools are incorporated into the well string to obtain various types of data. For example, logging-while-drilling tools may be used during a drilling operation to acquire and relay logging data for further analysis.

SUMMARY

In general, a system and methodology are provided for obtaining enhanced data related to a subterranean formation. The technique utilizes a collar having an arrangement of different types of sensors. The sensors are operable in combination to improve image quality of data obtained on the subterranean formation. Certain applications utilize an arrangement of sensors comprising at least one of each of an electromagnetic sensor and an ultrasonic pulse-echo transducer. A stabilizer or stabilizers may be used to precisely orient and position the sensors within a wellbore.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a system and methodology for obtaining enhanced data related to a subterranean formation. The technique utilizes a sensor arrangement which provides improved imagery based on, for example, electromagnetic and ultrasonic measurement physics. According to an embodiment, the technique combines a collar with an arrangement of different types of sensors, e.g electromagnetic, ultrasonic pulse-echo, resistivity, and/or microsonic sensors. In some applications, the sensors are arranged and operable in combination to improve the image quality of data obtained on the subterranean formation while the sensors are in oil base mud (OBM) or water base mud (WBM). Certain applications utilize an arrangement of sensors comprising at least one of each of an electromagnetic sensor and an ultrasonic pulse-echo transducer. A stabilizer or stabilizers may be used to precisely orient and position the sensors within a wellbore.

In logging applications, the sensors are combined in a logging-while-drilling (LWD) borehole imager to create a tool which provides improved imagery in OBM environments and other environments. The layout of the LWD tool employs sensor positioning as well as tool centralization to improve, e.g. stabilize, the image quality. For example, the tool may utilize a stabilizer or a pair of stabilizers with at least one of the stabilizers positioned proximate a plurality of electromagnetic sensors. In some applications, the electromagnetic sensors also may be mounted on sensor blades which extend radially outwardly from a base of a collar so as to move the sensors closer to a wellbore wall and to thus again improve the image quality of the data. The sensors may be used in various combinations to provide desired imagery, including borehole surface imagery such as rugosity and fracture. The technique also effectively provides a measurement tool with a unique sensor deployment which improves the stability of the measurement point.

Figure 1:
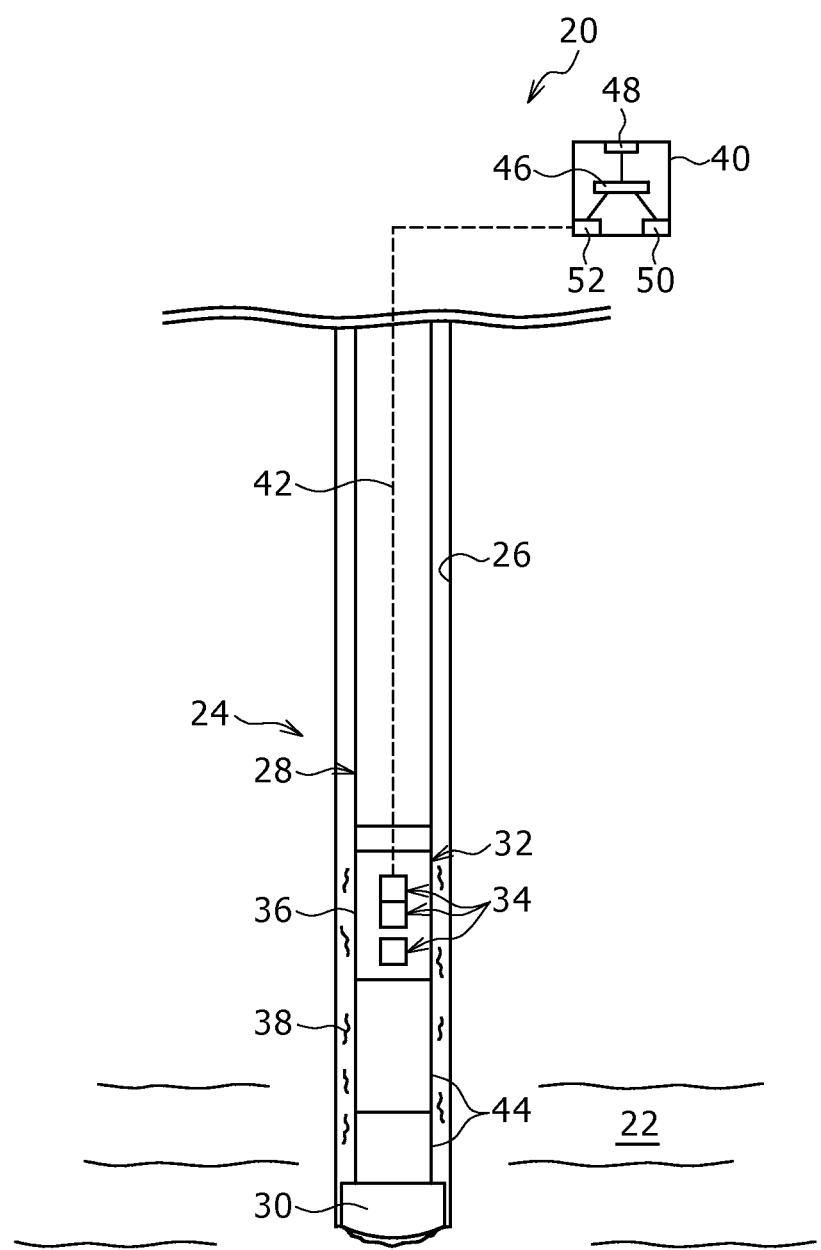
FIG. 1 is a schematic illustration of a well string deployed in a wellbore extending into a subterranean formation, according to an embodiment of the disclosure.

Referring generally to FIG. 1, a system 20 is illustrated as extending to a subterranean formation 22. For example, system 20 may be constructed for use in a well 24 comprising at least one wellbore 26. In the embodiment illustrated, system 20 comprises a well string 28 extending down along wellbore 26 to subterranean formation 22. In drilling applications, the well string 28 comprises a drill string deployed for drilling wellbore 26 via a drill bit 30. The system 20 further comprises a data collection system 32 having a plurality of dissimilar sensors 34. The data collection system 32 may be part of or coupled with well string 28 to collect data during drilling or other subterranean operations.

In drilling applications and certain other applications, the data collection system 32 may comprise a measurement-while-drilling (MWD) tool or a logging-while-drilling (LWD) tool 36 to which sensors 34 are mounted. The architecture of tool 36 and the arrangement of sensors 34 facilitate data collection while deployed in water base or oil base mud 38 during, for example, drilling applications. Data from the sensors 34 is transmitted to a control system 40 via a communication line 42, such as a suitable wired or wireless communication line.

The control system 40 may comprise a processor-based control system, such as a computer control system suitably programmed to process the data received from sensors 34. In the illustrated example, the control system 40 is located at a surface location but the control system 40 also may be located in whole or in part downhole, at the surface, and/or at remote locations. Depending on the application, well string 28 also may comprise a variety of other components 44, e.g. steering or motor components, selected for carrying out the given drilling application or other application within subterranean formation 22.

By way of example, control system 40 may comprise a processor 46 in the form of a central processing unit (CPU), e.g. a microprocessor. The processor 46 is operatively employed to intake and process data obtained from sensors 34. The processor 46 may be operatively coupled with a memory 48, an input device 50, and an output device 52. Memory 48 may be used to store many types of data, such as data collected and updated via the dissimilar sensors 34. Input device 50 may comprise a variety of devices, such as a keyboard, mouse, voice recognition unit, touchscreen, other input devices, or combinations of such devices. Output device 52 may comprise a visual and/or audio output device, such as a computer display, monitor, or other display medium having a graphical user interface. Additionally, the processing may be done on a single device or multiple devices locally, at a remote location, or with some local devices and other devices located remotely, e.g. a server/client system.

The control system 40 is able to work with selected algorithms, programs, and/or models for processing data obtained from sensors 34. The control system 40 also may function as a system for controlling operation of the sensors 34 by sending control signals downhole along communication line 42 so as to actuate specific sensors 34 or other devices associated with specific sensors 34. Depending on the application, the algorithms, programs, and/or models for processing collected data and/or for controlling the sensors 34 and related devices may be contained in a variety of software modules/programs which may be downloaded to control system 40.

Figure 2:
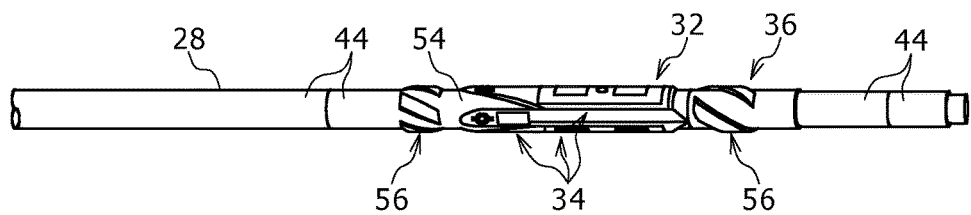
FIG. 2 is a side view of an example of a well string comprising a plurality of sensors, according to an embodiment of the disclosure.

Referring generally to FIG. 2, an example of the drill string 28 and data collection system 32 is illustrated. In this example, the data collection system 32 comprises tool 36, e.g. a logging-while-drilling tool, and sensors 34 arranged in a predetermined configuration on tool 36. For example, the sensors 34 may be mounted on a collar 54 of the tool 36 in an arrangement which improves image quality of the collected data even when tool 36 is a logging-while-drilling tool operated in oil base mud 38 within wellbore 26.

The tool 36 may further comprise at least one stabilizer 56 positioned to stabilize a posture of the tool 36 within wellbore 26. By way of specific example, the tool 36 is a logging-while-drilling tool and the sensors 36 and stabilizer 56 are arranged to improve the stability of a measurement point within wellbore 26, thus enhancing the collection of data and the image quality of that data. In the example illustrated, the at least one stabilizer 56 comprises a plurality of stabilizers 56, e.g. a pair of stabilizers, and the sensors 34 are positioned between the stabilizers 56.

The sensors 34 may comprise various types of dissimilar sensors positioned and arranged to stabilize and improve the image quality of the data collected by sensors 34. With additional reference to FIG. 3, an example of an arrangement of sensors 34 for achieving this functionality is illustrated. In this embodiment, sensors 34 comprise an electromagnetic sensor 58 which may be mounted proximate one of the stabilizers 56 to obtain, e.g. monitor, electromagnetic impedance measurements. The sensors 34 also comprise an ultrasonic pulse-echo transducer 60 positioned to obtain, e.g. monitor, ultrasonic pulse-echo measurements. In this example, the sensors 34 further comprise a microsonic sensor 62 positioned to obtain, e.g. monitor, microsonic refraction measurements. Some embodiments comprise or utilize a combination of electromagnetic sensor 58 and ultrasonic pulse-echo transducer 60 while other embodiments comprise or utilize other combinations of sensors, such as various combinations of electromagnetic sensors 58, ultrasonic pulse-echo transducers 60, microsonic sensors 62, resistivity sensors, and/or other suitable sensors 34. The sensors 34 are mounted on collar 54 and the at least one stabilizer 56 is positioned to provide a stable posture of the tool 36 while operating the sensors 34.

In the specific embodiment illustrated, the data collection system 32 comprises a plurality of electromagnetic sensors 58. For example, a pair of electromagnetic sensors 58 may be employed such that the individual electromagnetic sensors 58 are spaced circumferentially from each other and disposed on opposite sides of collar 54. The electromagnetic sensors 58 may be mounted on sensor blades 64 which extend radially outwardly from a base 66 of collar 54. In other words, the sensor blades 64 position the electromagnetic sensors 58 at a radially outward position closer to a wall of the wellbore 26. This configuration places the electromagnetic sensors 58 along a diameter which is much larger than a standard drill collar diameter to minimize distance between the sensor or sensors 58 and the borehole wall, thus improving the image quality of the data.

In the specific example illustrated, the two electromagnetic sensors 58 are located close to one of the stabilizers 56 so as to protect the exterior surface of each of the electromagnetic sensors 58. In some applications, additional electromagnetic sensors 58 may be mounted linearly or circumferentially along collar 54.

Figure 3:
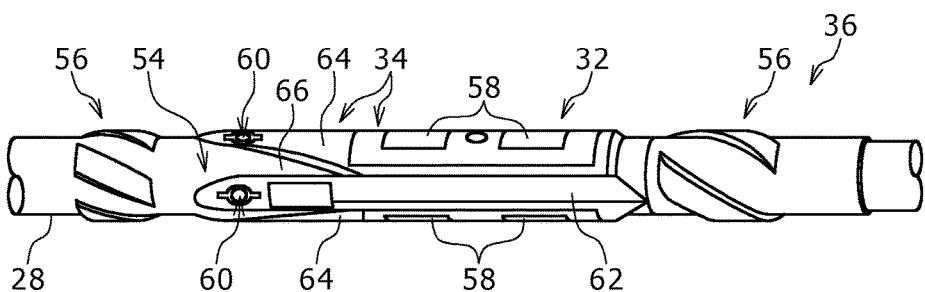
FIG. 3 is a side view of the plurality of sensors arranged on a collar of a tool, e.g. a logging-while-drilling tool, in a unique arrangement for improving image quality of the sensor data, according to an embodiment of the disclosure.

Referring again to the embodiment illustrated in FIG. 3, the data collection system 32 also may comprise a plurality of the ultrasonic pulse-echo transducers 60. For example, a plurality of the ultrasonic pulse-echo transducers 60 may be positioned at different locations around the circumference of collar 54. In a specific example, four ultrasonic pulse-echo transducers 60 are positioned circumferentially around collar 54 and located 90° from each other. In this example, an individual or plural microsonic sensors 62 may be positioned along collar 54, e.g. circumferentially between electromagnetic sensors 58, to facilitate measurements and data collection in both water base mud and oil base mud environments. However, some applications may not employ microsonic sensors 62.

The sensors 34, e.g. sensors 58, 60, 62, may be used in various combinations and arrangements to improve the image quality of data obtained in wellbore 26. For example, a combination use of at least one electromagnetic sensor 58 and at least one ultrasonic pulse-echo transducer 60 functions to improve the image quality of data collected in the wellbore 26. The use of these two different types of sensors 34 to provide data to control system 40 enables the reliable correction of data with respect to formation characterization. In other words, the data from one type of sensor 34 is used by control system 40 to provide reliable correction of data from the other type of sensor or sensors 34. For example, the electromagnetic sensor 58 and the ultrasonic pulse-echo sensor 60 may be used in combination to correct data related to formation characteristics of formation 22 containing wellbore 26. In some applications, sensor pairs, comprising an electromagnetic sensor 58 and an ultrasonic pulse-echo transducer 60, are aligned in an axial direction to facilitate collection of data in a manner which provides the reliable data correction and further improves the image quality of data collected. In the latter example, the electromagnetic sensors 58 are positioned proximate one of the stabilizers 56 and corresponding ultrasonic pulse-echo transducers 60 are mounted in linear alignment with the electromagnetic sensors 58 on a side of the electromagnetic sensors 58 opposite the closely spaced stabilizer 56.

Figure 4:
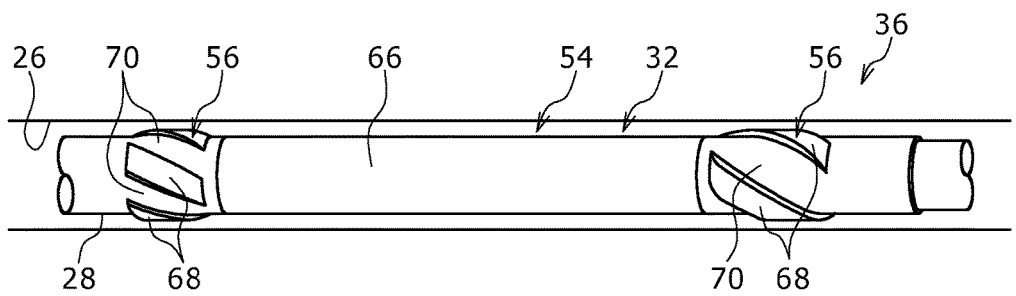
FIG. 4 is an illustration of an example of stabilizers which may be used to position the plurality of sensors at a desired location and posture within the wellbore, according to an embodiment of the disclosure.

Referring generally to FIG. 4, the stabilizer or stabilizers 56 also may be used in combination with sensors 34 to further improve image quality in the borehole by establishing a desired posture, e.g. orientation, of the tool 36 and by providing greater stability of the measurement point within wellbore 26. As illustrated in FIG. 4, an individual stabilizer 56 or a plurality of stabilizers 56 may be used to centralize tool 36. The stabilizers 56 and the overall layout of tool 36, e.g. position of collar 54 and sensors 34, are used to establish a posture of the tool 36 and thus of sensors 34 which provides a high quality and stabilized image from the data collected. The types of dissimilar sensors 34 and the arrangement of those sensors 34 also enable monitoring of different types of parameters while providing improved image quality and/or reliable data correction.

Figure 5:
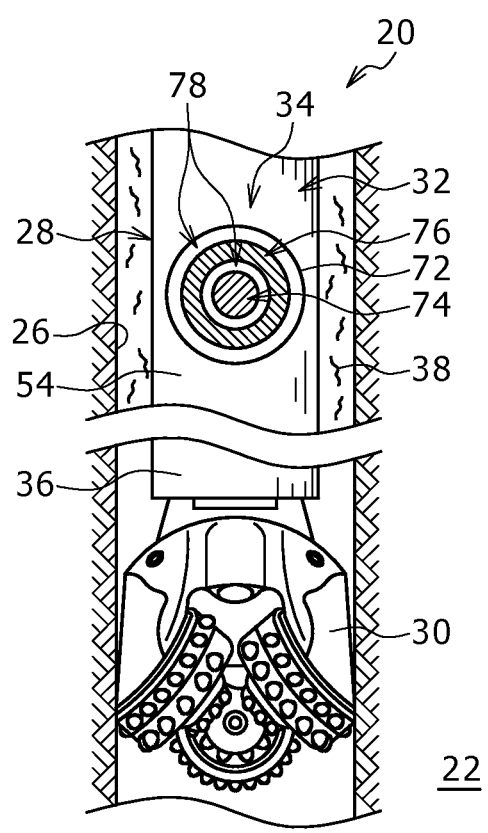
FIG. 5 is a side view of another example of a well string comprising other types of sensors, according to an embodiment of the disclosure.

Each stabilizer 56 may have a variety of constructions. For example, each stabilizer 56 may comprise a plurality of stabilizer blades 68 separated by channels 70. The channels 70 are oriented to enable flow along well string/drill string 28 during a drilling operation or other operation utilizing fluid flow. In some applications, the stabilizer blades 68 may be generally helical in form such that the corresponding channels 70 provide a helical flow path. The radial extent of the stabilizer blades 68 is selected according to the diameter of wellbore 26 so as to stabilize the data collection system 32 at the desired point or location within wellbore 26. It should be noted that the sensors illustrated are provided as examples of sensors and that other types of sensors may be combined with or used instead of the sensors described above. As illustrated in FIG. 5, for example, the tool 36 may comprise sensors which use electrodes for detecting various formation characteristics. In some applications, the electrodes may be employed as a resistivity type sensor 72. According to an embodiment, an electrode 74 is used to inject a current into the surrounding fluid 38 and into the subterranean formation 22. In this example, collar 54 is a metallic collar and may be used as a current-return electrode. Additionally, a guard electrode 76 may be held at a potential analogous to a potential of electrode 74 to reduce sensitivity to stray currents. In this embodiment, insulators 78 may be positioned to electrically decouple/insulate electrode 74 and guard electrode 76 from the rest of the tool 36. The sensor 72 may be used in combination with other individual sensors or combinations of sensors, such as sensors 58, 60, and/or 62 described above.

The technique may be employed in many types of wells having a variety of wellbores. The wells may comprise deviated boreholes, single boreholes, multiple boreholes, as well as many arrangements and sizes of boreholes. The methodology can further be used with a wide variety of drilling techniques employing oil base mud or water base mud. Similarly, the system and methodology may be used to improve the image quality of data acquired with respect to a variety of parameters in a wide range of formations and subterranean environments.

The technique also may utilize various data collection systems and stabilizers to provide a controlled tool posture and stabilized detection points along the wellbore. Various types and numbers of sensors may be employed in combination to, for example, utilize electromagnetic and ultrasonic measurement physics for improving the image quality of the collected data. Additionally, the collected electromagnetic and sonic data may be used to reliably correct data obtained by one type of sensor with respect to formation characteristics. Various stabilizer structures, sensor blades, and/or other collar structures may be used to position and protect specific types of sensors.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for use in a well, comprising:
    a drill string deployed for drilling a wellbore, the drill string having a logging-while-drilling tool positioned to provide imaging in oil or water base mud using electromagnetic and ultrasonic measurements, the logging-while-drilling tool comprising:
    a steering or motor component;
    a stabilizer positioned to stabilize a posture of the logging-while-drilling tool in the wellbore;
    an electromagnetic sensor mounted proximate the stabilizer to obtain electromagnetic impedance measurements associated with formation characteristics of a formation into which the wellbore extends; and
    an ultrasonic pulse-echo transducer to obtain ultrasonic pulse-echo measurements associated with the formation characteristics of the wellbore,
    wherein the electromagnetic sensor and the ultrasonic pulse-echo transducer are located across the stabilizer from the steering or motor component.

2. The system as recited in claim 1, wherein the electromagnetic sensor and the ultrasonic pulse-echo transducer are mounted on a collar of the logging-while-drilling tool and further wherein the electromagnetic sensor is mounted on a sensor blade.

3. The system as recited in claim 2, wherein the electromagnetic sensor comprises a plurality of electromagnetic sensors, the plurality of electromagnetic sensors being mounted on a plurality of sensor blades extending radially outwardly from a base of the collar.

4. The system as recited in claim 1, further comprising a microsonic sensor to obtain microsonic refraction measurements.

5. The system as recited in claim 4, wherein the electromagnetic sensor, the ultrasonic pulse-echo transducer, and the microsonic sensor are mounted between stabilizers of a pair of stabilizers.

6. The system as recited in claim 1, further comprising at least one electrode for measuring resistivity.

7. The system as recited in claim 1, wherein the ultrasonic pulse-echo transducer comprises a plurality of ultrasonic pulse-echo transducers.

8. The system as recited in claim 1, wherein the ultrasonic pulse-echo transducer comprises four ultrasonic pulse-echo transducers located at 90° circumferential intervals.

9. The system as recited in claim 1, wherein the electromagnetic sensor and the ultrasonic pulse-echo transducer are in a linear alignment with each other and used in combination to correct data related to the formation characteristics.

10. The system as recited in claim 1, wherein the electromagnetic sensor and the ultrasonic pulse-echo transducer are axially aligned.

11. A method of obtaining data on a subterranean formation, comprising:
    positioning a steering or motor component, a stabilizer, an electromagnetic sensor and an ultrasonic pulse-echo transducer on a tool collar, wherein the electromagnetic sensor and the ultrasonic pulse-echo transducer are in a linear alignment with each other and located across the stabilizer from the steering or motor component;
    mounting the tool collar in a well string;
    deploying the tool collar downhole into a wellbore via the well string; and
    using the electromagnetic sensor and the ultrasonic pulse-echo transducer in combination to improve image quality of data obtained on the subterranean formation.

12. The method as recited in claim 11, further comprising positioning the stabilizer on the tool collar proximate the electromagnetic sensor.

13. The method as recited in claim 12, wherein positioning comprises positioning a plurality of electromagnetic sensors on blades to locate the plurality of electromagnetic sensors closer to a wall of the wellbore.

14. The method as recited in claim 13, wherein positioning comprises locating a plurality of ultrasonic pulse-echo transducers around a circumference of the tool collar.

15. The method as recited in claim 11, wherein using comprises correcting data related to formation characterization.

16. The method as recited in claim 11, further comprising positioning a microsonic sensor on the tool collar and placing the electromagnetic sensor, the ultrasonic pulse-echo transducer, and the microsonic sensor between stabilizers.

17. A device for obtaining data on a subterranean formation, comprising:
    a collar having a stabilizer to provide stability of a measurement location in a wellbore;
    a steering or motor component connected to the collar;
    a plurality of electromagnetic sensors mounted circumferentially on the collar proximate the stabilizer to obtain electromagnetic impedance measurements associated with the subterranean formation;
    an ultrasonic pulse-echo transducer mounted on the collar to obtain ultrasonic pulse-echo measurements associated with the subterranean formation; and
    a microsonic sensor mounted on the collar circumferentially between the plurality of electromagnetic sensors to obtain microsonic refraction measurements, the plurality of electromagnetic sensors, the ultrasonic pulse-echo transducer, and the microsonic sensor being operable in combination to improve image quality of data obtained on the subterranean formation,
    wherein the plurality of electromagnetic sensors and the ultrasonic pulse-echo transducer are in a linear alignment with each other and located across the stabilizer from the steering or motor component.

18. The device as recited in claim 17, wherein the plurality of electromagnetic sensors are mounted on sensor blades.

19. The device as recited in claim 18, wherein the ultrasonic pulse-echo transducer comprises four ultrasonic pulse-echo transducers mounted 90° from each other around a circumference of the collar.

* * * * *